United States Patent Office 3,346,516
Patented Oct. 10, 1967

3,346,516
PROCESS FOR PRODUCING GUANIDINE-SUB-STITUTED CROSS-LINKED POLY(VINYL AROMATIC) ANION EXCHANGE RESINS
Robert G. Minton, Levittown, Pa., assignor to Rohm & Haas Company, Philadelphia, Pa., a corporation of Delaware
No Drawing. Filed Aug. 9, 1963, Ser. No. 301,205
1 Claim. (Cl. 260—2.1)

This invention concerns anion exchange resins, the basicities of which are intermediate between the basicity of the so-called weakly basic anion exchange resins and the basicities of the so-called strong base or quaternary anion exchange resins. More specifically, it concerns anion exchange resins in which the basic groups are guanidyl groups.

There are anion exchangers described in the prior art which are prepared by reacting guanidine with other compounds in typical condensation reactions, but in these resins guanidine becomes part of the backbone or polymer, thus producing a weak base resin unless quaternized.

The weak base anion exchangers of the prior art, although they can be efficiently regenerated, cannot split neutral salts, nor can they pick up silica or carbon dioxide. For this reason, their use in water conditioning, particularly for boiler feed, has been seriously curtailed.

The prior art strong base or quaternary anion exchangers will pick up silica and $CO_2$ and split neutral salts, but the regeneration thereof is quite inefficient. As much as three times the theoretical amount of regenerant is frequently used, and because of their high basicity it is necessary to use a strong base such as sodium hydroxide or potassium hydroxide to convert the resins to the free base or hydroxyl form.

The anion exchangers of the present invention are unique in that they will split neutral salts, but they do not require a strong base for regeneration, being regenerable with ammonia. Furthermore, they exhibit high regeneration efficiencies with caustic as will be set forth in detail hereinafter.

The prior art strong base anion exchange resins, in the free base or in the hydroxyl form, are heat-sensitive, as are most quaternary ammonium compounds. If operated at elevated temperatures, even for a relatively short period of time, they lose basicity and revert to a weak base type. In comparison with the prior art strong base anion exchangers, the resins of the present invention, even when in the free base form, exhibit remarkable stability at elevated temperatures. This is particularly true in non-aqueous media, and this is particularly advantageous since the prior art's strong base anion exchangers exhibit rapid degradation at elevated temperatures in anhydrous media.

The applications of anion exchange resins are well-known and have been discussed in detail in the voluminous literature which describes them. The resins of the present invention are useful in these applications.

The resins of the present invention are prepared by reacting a chloromethylated copolymer of a monovinyl aromatic monomer and a cross-linker therefor with guanidine, preferably in a mixed solvent consisting of a lower alkanol and a swelling solvent for the copolymer.

The system must be anhydrous, since no reaction occurs in the presence of water.

Typical examples of suitable monovinyl aromatic monomers are styrene, vinyl toluene, α-methylstyrene, vinyl naphthalene, and vinyl anthracene. Particularly suitable is styrene because of its ready availability and low cost.

Typical cross-linking agents for the desired polymerizable monomers are polyvinyl compounds used singly or in mixtures, such as meta-divinylbenzene, para-divinylbenzene, mixtures of these isomers, 1,3,5-trivinylbenzene, 1,2,4-trivinylbenzene, trivinoxypropane, the isomeric divinyl xylenes, divinyl toluenes, and divinylnaphthalenes, N,N'-methylene bisacrylamide, N,N'-methylene-bismethacrylamide, and N,N'-divinyl ethylene urea. A particularly suitable cross-linker is divinylbenzene. The amount of cross-linker can be varied widely within the scope of the invention and may be varied from about 0.5% to 50%. As set forth hereinafter, conventional or gel type copolymers are difficult to chlorinate and aminate or guanidate if the percentage of cross-linker is too high. With resins of this type, a particularly preferred range of cross-linker is 0.5% to 10%. The macroreticular-structured resins, because of their macroporous structure are much more readily chloromethylated and aminated or guanidated and, for resins of this type, a particularly preferred range of cross-linker is from 3 to 50%.

The chloromethylation of polymers or copolymers containing aromatic rings in the polymer is well-known, being set forth in detail in U.S. Patent Nos. 2,591,573, 2,591,574, and 2,629,710. Using a styrene-divinylbenzene copolymer as a typical example, the copolymer is swelled with a swelling solvent, such as ethylene dichloride, and it is treated with chloromethyl ether in the presence of aluminum chloride, thus attaching $-CH_2Cl$ groups to the polymer chain. Bromomethyl ether can also be used, but inasmuch as the chloromethyl ether is appreciably less expensive, functions very satisfactorily, and is commercially available, there is no advantage in using bromomethyl ether.

The molar ratios of the chloromethyl groups on the copolymer to guanidine can be varied. As an illustration of this fact, the ratios in the examples which follow below range from 0.5 (Example 3) to 3.8 (Example 6) moles of guanidine per $-CH_2Cl$ group on the monomer. A preferred range is 1.5 (Example 4) to 2.0 (Example 2) moles. The number of $-CH_2Cl$ groups on the polymer can be determined by a chlorine analysis of the polymer.

The reaction temperature can also be varied widely but a preferred range is from 0° C. to 70° C. A particularly preferred operating temperature range is 40° C. to 65° C.

As indicated hereinbefore, it is preferred to employ a mixed solvent, such as a lower alkanol and a swelling solvent for the copolymer such as tetrahydrofuran, dioxane or diglyme. A particularly preferred combination is ethanol and tetrahydrofuran in the ratio of one part ethanol to two parts tetrahydrofuran. All the reactants, including the solvents, must be anhydrous. After the guanidation, the beads are removed from the reaction mixture by filtration, washed with ethanol or methanol and finally with deionized water.

The reaction can be carried out at sub-atmospheric or super-atmospheric pressures but since no advantages are gained, it is preferred to carry it out at atmospheric pressure.

Substituted guanidines can be employed in the reaction, and typical of these are tetra-alkyl guanidines such as tetramethyl guanidine, tetraethyl guanidine and tetrapropyl guanidine. Guanidines can be substituted with other groups, e.g. mono, di and tri alkyl groups, as long as the groups are not reactive with the halomethylated polymer. However, it is preferred to use un-substituted guanidine since the use of substituted guanidines decreases the weight ion exchange capacity of the anion exchanger.

It is set forth hereinbefore that the regeneration efficiency of the resins of the present invention was appreciably superior to that of the previously known strong base anion exchangers. The regeneration efficiency of the guanidine resin prepared by the process of the present invention and a dimethyl-ethanolamine quaternary type anion exchanger (Type II) prepared using a copolymer of styrene and divinylbenzene 80/20 which had a surface area of 50 sq. m./g. and a porosity of 0.48 are shown in Table I:

TABLE I

| Meq. NaOH/Meq. Capacity | Percent Regeneration of SSAC | |
|---|---|---|
| | Guanidine [1] | Dimethyl-ethanol-ammonium [2] |
| 1.88 | 85.5 | 62 |
| 3.00 | 93 | 69 |

[1] Total SSAC 1.1 meq./g.
[2] Total SSAC 1.25 meq./g.

It has been shown in the foregoing table that guanidine resins of the present invention are much more efficiently regenerated with caustic than are the conventional or strong base quaternary type anion exchange resins and it is also true that guanidine resins can be efficiently regenerated with aqueous ammonia, whereas the conventional quaternary types show little or no regeneration.

A styrene-divinylbenzene copolymer was chloromethylated using chloromethyl ether in the presence of aluminum chloride and a portion of this chloromethylated copolymer was treated with guanidine according to the process of the present invention and another portion was aminated with dimethylethanolamine.

An experiment was conducted in which 1 liter of 0.29% $NH_4OH$ was passed through 5 grams of moist guanidine resin and an equivalent amount of ammonia was passed through 5 grams of a strong base quaternary (both exchangers prepared as in the preceding paragraph). Under these conditions, two different guanidine resins employed (prepared by slight modifications of the reaction conditions), showed a 67% regeneration and a 75% regeneration respectively. Under identical conditions, the conventional quaternary anion exchange resin showed only a 17% regeneration. In other words, the guanidine resins of the present invention exhibit a regeneration efficiency with ammonia which makes them completely operable under commonly used conditions, whereas the conventional quaternary resins would be practically useless.

The copolymer "backbone" which is halomethylated and subsequently treated with the guanidine according to the process of the present invention can be the so-called "conventional" or gel type copolymers which are well-known in the prior art and have been referred to hereinbefore. The copolymers can be, however, and it is frequently desired that they be, a copolymer which possesses a macroreticular structure. This structure is markedly different from that possessed by the gel resins and is characterized by high porosity and can have high specific surface. Such copolymers are prepared by copolymerizing a monoethylenically unsaturated monomer and a polyethylenically unsaturated monomer in the presence of a substance which is a solvent for or dissolves in the monomer mixture and which does not swell or be imbibed by the copolymer which results. It is important that this substance be present in an amount sufficient to cause phase separation, and thus produce the macroreticular structure. Depending on the particular monomer systems involved and the nature of the substance being employed, which substance is frequently referred to as a "precipitant," said substance or precipitant will be present in an amount of approximately 25% to 60% of the total weight of the monomer mixture and the precipitant. U.S. Patent No. 3,037,052 gives the preparations of these resins in detail.

Because of their dense structure, it is difficult to chloromethylate conventional resins with a high amount of cross-linker. Because of their porous structure, however, high amounts of cross-linker can be employed with the macroreticular structures without adversely affecting the ease of chloromethylation. Because the physical and chemical resistances of copolymers depends, in good part at least, on the amount of cross-linker employed, said resistances being higher with higher degrees of cross-linking, this means that, particularly for drastic use conditions, the macroreticular type copolymers are preferred for the backbone.

Regardless of the amount of cross-linker, the macroreticular-structured resins show improved physical resistance when compared with the conventional gel types.

*Example I*

To one hundred grams of chloromethylated styrene beads (6.4 meq. of Cl/gram) is added 1 equivalent of guanidine in 450 ml. of a mixture consisting of 1 part anhydrous ethanol and two parts dry tetrahydrofuran. This mixture is stirred at 40° C. for 24 hours and the beads filtered off and washed with two portions of ethanol (200 ml.) and then with D.I. water.

The above beads have a total base capacity of 4 meq./gram and a strong base capacity, i.e., salt-splitting capacity, of 2.5 meq./gram.

*Example II*

To 50 grams of a chloromethylated styrene-divinylbenzene resin having a surface area of 60 m.$^2$/gram, a porosity of 0.32 and a chlorine content of 4.6 meq./gram was added 460 meq. of guanidine in 160 grams of a 50-50 mixture of anhydrous ethanol and anhydrous tetrahydrofuran. The mixture was heated, with stirring, to a temperature of 40° C. for a period of 96 hours. The resin was removed, washed with D.I. water until neutral. The resin was regenerated with 12 meq. of NaOH (5%) per gram of resin and washed with D.I. water until the washings were neutral. This resin possessed a salt-splitting capacity of 1.2 meq. per dry gram and had an acid neutralizing capacity of 4.3 meq./gram.

This resin was azeotropically dried with benzene and refluxed for four hours after the last water had been removed. The resin treated in this manner retained 78% of the original strong base (salt splitting) capacity. A quaternary hydroxide resin treated in the same manner had no detectable salt-splitting capacity after this treatment.

*Example III*

A chloromethylated styrene-divinylbenzene resin, as described above, 50 grams was placed in a flask equipped with a stirrer and reflux condenser protected from atmospheric moisture. To this was added 150 ml. of anhydrous THF/ethanol (60/40) containing 120 meq. of guanidine. This mixture was heated under reflux for six hours and allowed to stand for 24 hours. A sample at this point had a salt-splitting capacity of 0.7 meq./gram. An additional 120 meq. of guanidine in 50 ml. of 60/40 THF/ethanol was added and the mixture was refluxed six hours and allowed to stand for eighteen hours. A sample at this point had a salt-splitting capacity of 1.1 meq./gram. An additional charge of 120 meq. of guanidine in 50 ml. of solvent was added and refluxed for six hours and allowed to stand for 20 hours. A final sample had a salt-splitting capacity of 1.1 meq./gram and a total base capacity of 3.9 meq./gram.

*Example IV*

The procedure of Example I was repeated using a solvent mixture consisting of 2 parts of dioxane and 1 part ethanol. The resin had a salt splitting capacity of 1.1 meq./gram and a total base capacity of 4.3 meq./gram.

*Example V*

To 50 grams of a chloromethylated styrene-divinylbenzene resin with a chlorine content of 6.4 meq./gram, a porosity of 0.28 and a surface area of less than 0.5 m.$^2$/gram was added one equivalent of guanidine in 200 ml. of a solvent composed of 2 parts of the dimethyl ether of diethylene glycol and 1 part anhydrous ethanol. The mixture was heated at 40° C. for 72 hours. The resin was washed with ethanol and D.I. water.

The above beads had a salt-splitting capacity of 2.2 meq./gram and a total base capacity of 3.0 meq./gram.

*Example VI*

To 50 grams of a chloromethylated styrene-divinylbenzene resin with a chlorine content of 5.4 meq./gram, a porosity of 0.28 and a surface area of less than 0.5 m.$^2$/gram was added one equivalent of tetramethyl guanidine in 200 ml. of an anhydrous mixture of THF/ethanol (60/40). This mixture was stirred under an inert atmosphere and held at a temperature of 40° C. for 48 hours. The sample had a salt-splitting capacity of 2.6 meq./gram and a total base capacity of 4.3 meq./gram.

I claim:

A process for the preparation of an anion exchange resin whose basic groups are guanidyl groups, which consists in reacting under anhydrous conditions (a) a halomethylated copolymer of a monovinyl aromatic monomer and a cross-linker therefor, and (b) a guanidine selected from the group consisting of (1) guanidine and (2) tetraalkyl substituted guanidines, the proportions of the reactants being 0.5 to 3.8 moles of the guanidine per equivalent of the halomethylated groups in said copolymer, said reaction being carried out at a temperature between 0° and 70° C. in the presence of a mixed solvent consisting of a lower alkanol and a solvent which is a swelling agent for the copolymer selected from the class consisting of tetrahydrofuran, dioxane and diglyme.

References Cited

UNITED STATES PATENTS

| 2,515,116 | 7/1950 | Dudley | 260—2.1 |
| 2,632,000 | 3/1953 | McMaster et al. | 260—2.1 |
| 2,895,925 | 7/1959 | Hwa | 260—2.1 |
| 2,972,586 | 2/1961 | Van Der Neut et al. | 260—2.1 |
| 3,037,052 | 5/1962 | Bortnick | 260—2.2 |
| 3,133,889 | 5/1964 | Hazenberg et al. | 260—2.1 |

WILLIAM H. SHORT, *Primary Examiner.*

SAMUEL H. BLECH, *Examiner.*

C. A. WENDEL, H. D. ANDERSON,
*Assistant Examiners.*